(12) United States Patent
Bernstein et al.

(10) Patent No.: US 7,520,179 B2
(45) Date of Patent: Apr. 21, 2009

(54) METHOD AND APPARATUS FOR MEASURING FORCE PARTICULARLY TORQUE

(75) Inventors: Michael Bernstein, Ashkelon (IL); Arie Ariav, Doar-Na Hof Ashkelon (IL); Vladimir Ravitch, Ashkelon (IL)

(73) Assignee: Nexense Ltd., Yavne (IL)

( * ) Notice: Subject to any disclaimer, the term of this patent is extended or adjusted under 35 U.S.C. 154(b) by 147 days.

(21) Appl. No.: 10/585,102

(22) PCT Filed: Dec. 30, 2004

(86) PCT No.: PCT/IL2004/001190

§ 371 (c)(1),
(2), (4) Date: Jun. 30, 2006

(87) PCT Pub. No.: WO2005/062719

PCT Pub. Date: Jul. 14, 2005

(65) Prior Publication Data

US 2007/0113669 A1    May 24, 2007

(30) Foreign Application Priority Data

Dec. 30, 2003    (IL) ..................... 159651

(51) Int. Cl.
    *G01N 29/04* (2006.01)
(52) U.S. Cl. ...................................................... 73/801
(58) Field of Classification Search .................. 73/801, 73/761
    See application file for complete search history.

(56) References Cited

U.S. PATENT DOCUMENTS

| | | | | |
|---|---|---|---|---|
| 4,569,229 | A | * | 2/1986 | de Halleux .................. 73/597 |
| 5,115,681 | A | * | 5/1992 | Bouheraoua et al. .......... 73/801 |
| 5,750,900 | A | * | 5/1998 | Hugentobler et al. ......... 73/779 |
| 7,043,999 | B2 | * | 5/2006 | Bernhard et al. .............. 73/801 |
| 2005/0178205 | A1 | * | 8/2005 | Nitsan ......................... 73/597 |

* cited by examiner

*Primary Examiner*—Max Noori

(57) ABSTRACT

A method and apparatus for measuring the force applied by a first member coupled to a second member by a connecting body, by: transmitting a cyclically-repeating energy wave through the connecting body from a first location thereon to a second location thereon; measuring the transit time of the cyclically-repeating energy wave from the first location to the second location; and utilizing the measured transit time to produce a measurement of the force. In the preferred described embodiment, the connecting body is a fastening plate which fastens a drive shaft to a driven shaft and measures the torque output of the drive shaft.

13 Claims, 5 Drawing Sheets

METHOD AND APPARATUS FOR MEASURING FORCE PARTICULARLY TORQUE

RELATED APPLICATIONS

This application is a National Phase Application of PCT Patent Application No. PCT/IL2004/001190 having International Filing Date of Dec. 30, 2004, which claims the benefit of Israel Patent Application No. 159651 filed on Dec. 30, 2003. The contents of the above Applications are all incorporated herein by reference.

FIELD AND BACKGROUND OF THE INVENTION

The present invention relates to a method and apparatus for measuring force, particularly torque. The invention is especially useful in measuring the output torque of a vehicle, and/or other forces encountered in a motor vehicle. The invention is therefore described below with respect to such applications, but it will be appreciated that the invention is capable of being used in many other applications as well.

The instantaneous output torque of a vehicle engine can be used for controlling the fuel fed to the engine, and/or the ignition of the fuel, in order to increase the efficiency of the vehicle engine. It can also be used to provide an indication that an engine overhaul may be needed. Many torque measuring devices have been used for these purposes. However, efforts are continually being made to increase the precision of the torque measurement, to decrease the sensitivity of the torque measurement to rotational velocity or temperature variations, and/or to provide a more simple and compact construction capable of convenient introduction into existing vehicles and of withstanding the harsh environmental conditions therein.

OBJECTS AND BRIEF SUMMARY OF THE PRESENT INVENTION

An object of the present invention is to provide a method, and also apparatus, for measuring torque and other forces, having advantages in one or more of the above respects particularly when used in the above-mentioned applications in motor vehicles.

According to one broad aspect of the present invention, there is provided a method of measuring a force applied by a first member to a second member via a connecting body, comprising: comprising: transmitting a cyclically-repeating acoustical wave through a transmission channel in said connecting body from a first location thereon to a second location thereon; measuring the transit time of said acoustical wave through said transmission channel from said first location to said second location; and utilizing said measured transit time to produce a measurement of said force.

In the preferred embodiment of the invention described below, the connecting body is a fastening plate which fastens the first member to the second member, the two members being rotary members fastened for rotation together about a common axis by the fastening plate, such that the force measured is the torque applied by the first rotary member to the second rotary member.

According to another aspect of the present invention, there is provided a method of measuring the torque applied by a drive shaft to a driven shaft along a common axis of rotation, comprising: coupling the shafts together by fixing at least one torque sensor plate to one of the shafts at a first fixation point eccentric with respect to the common axis of rotation, and to the other one of the shafts at a second fixation point spaced from the first fixation point; measuring the deformation of the torque sensor plate in a section thereof between the first and second fixation points; and utilizing the measured deformation to produce a measurement of the torque; the second fixation point being spaced from the first fixation point along a tangential line substantially perpendicular to a radial line from the first fixation point to the axis of rotation, such that the deformed section of the torque sensor plate between the first and second fixation points is expanded or contracted, depending on the direction of rotation of the drive shaft.

According to a further aspect of the present invention, there is provided apparatus for measuring a force applied by a first member to a second member via a connecting body, comprising: a transmitter at a first location on the connecting body for transmitting a cyclically-repeating acoustical wave through a transmission channel in the connecting body to a second location thereon; a receiver at the second location on the connecting body for receiving the cyclically-repeating acoustical wave; and an electrical system for measuring the transit time of the cyclically-repeating acoustical wave through the transmission channel from the first location to the second location and for utilizing the measured transit time to produce a measurement of the force.

Other aspects of the invention provide apparatus for measuring torque or other forces in accordance with the above method.

As will be described more particularly below, the method and apparatus including the foregoing features enable measuring torque with high precision and with relative insensitivity to rotational velocity and temperature variations. In addition, the method may be implemented in apparatus which is of a relatively simple, compact construction, and which is capable of convenient introduction into existing vehicles and of withstanding the harsh environmental conditions therein.

Particularly good results are obtainable when the measurement of the deformation in the connecting member (e.g., the torque sensor plate) is effected according to the high-precision measurement system described in U.S. Pat. No. 6,621,278, of Sep. 16, 2003, assigned to the assignee of the present application, although it will be appreciated that other deformation measuring systems could also be used, such as by the use of conventional strain gauges.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

FIGS. 1-5 of the drawings illustrate a novel torque measuring method and apparatus in accordance with the present invention implemented in an automotive vehicle for producing a continuous measurement of the engine torque. In the illustrated implementation, the torque measurement is effected in the coupling between the flywheel connected to the engine output shaft, and the clutch disc connected to the engine gearbox shaft. This connection is typically made by three fastening bolts securing the flywheel to the clutch disc at their outer peripheries. Thus, the mechanical energy from the engine is transmitted via the flywheel and clutch disc by means of these three bolts. Each bolt is loaded with a total shearing force F=M/R, wherein "M" is the force applied to the bolt, and "R" is the distance between the disc axis of rotation and the bolt axis. The engine torque is the total force (3F) applied to the three bolts.

In the embodiment of the invention illustrated in FIGS. 1-5, the loading of these bolts is sensed in order to provide a measurement of the output torque of the engine.

Figure 1:
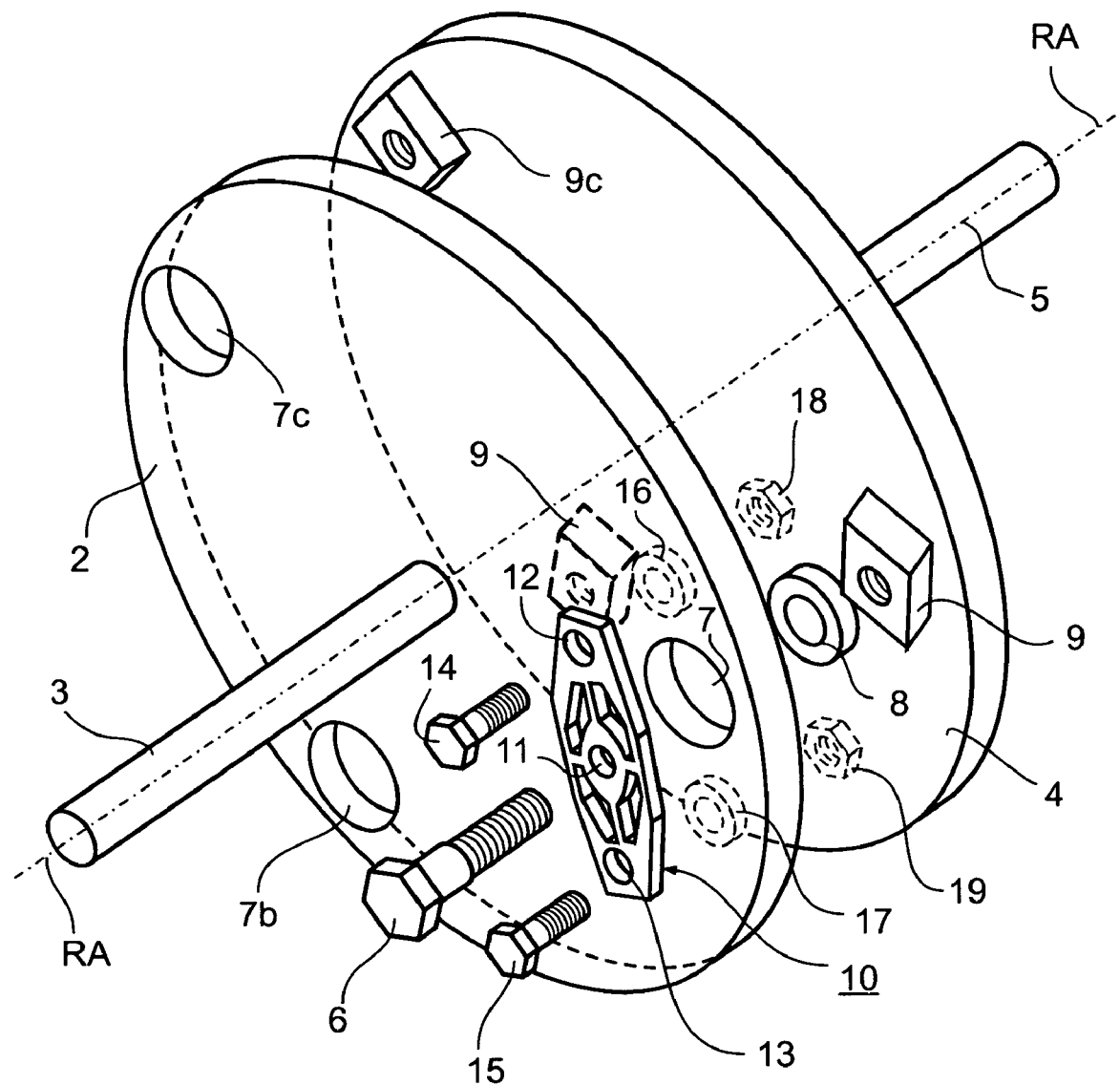
FIG. 1 is an exploded three-dimensional view illustrating a torque measuring device constructed in accordance with the present invention, but showing only one of the three torque sensor plates therein.

Thus, FIG. 1 illustrates the coupling between the flywheel 2 connected to the engine via drive shaft 3, and the clutch disc 4 connected to the load via driven shaft 5 and the gearbox (not shown). This coupling is effected by the three fastening bolts mentioned above, one of which is shown at 6. Each fastening bolt 6 passes through an opening 7 in the flywheel disc 2 and is threaded into a threaded member 9 fixed to the clutch disc 4.

In accordance with the present invention, a fastening plate, generally designated 10, serving as a torque sensor plate, is coupled by each fastening bolt 6 to flywheel disc 2 and the clutch disc 4 in a manner to sense the torque transmitted via the respective bolt. While FIG. 1 illustrates only one such torque sensor plate 10 for bolt 6, it will be appreciated that there are three such torque sensor plates, as schematically shown at 10a, 10b and 10c in FIG. 2, each secured by a fastening bolt 6a, 6b, 6c, respectively.

Figure 3:
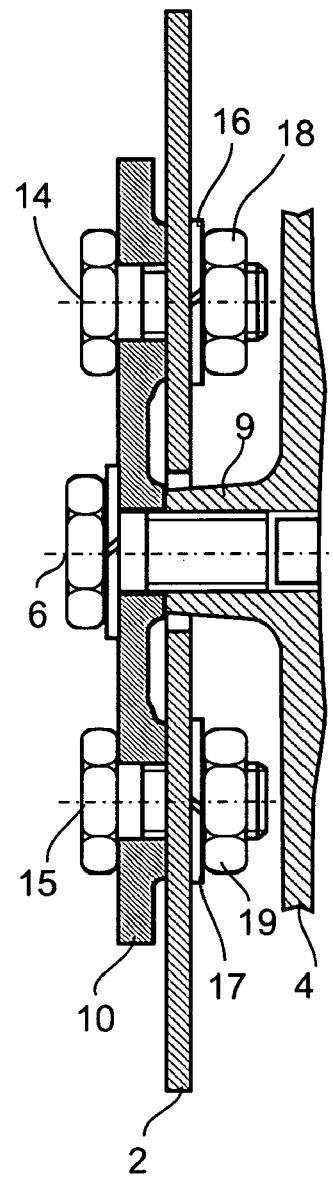
FIG. 3 is an enlarged, fragmentary sectional view illustrating the one torque sensor plate of FIG. 1 and the manner it is coupled to the drive and driven shafts as shown in FIG. 1.
Figure 4:
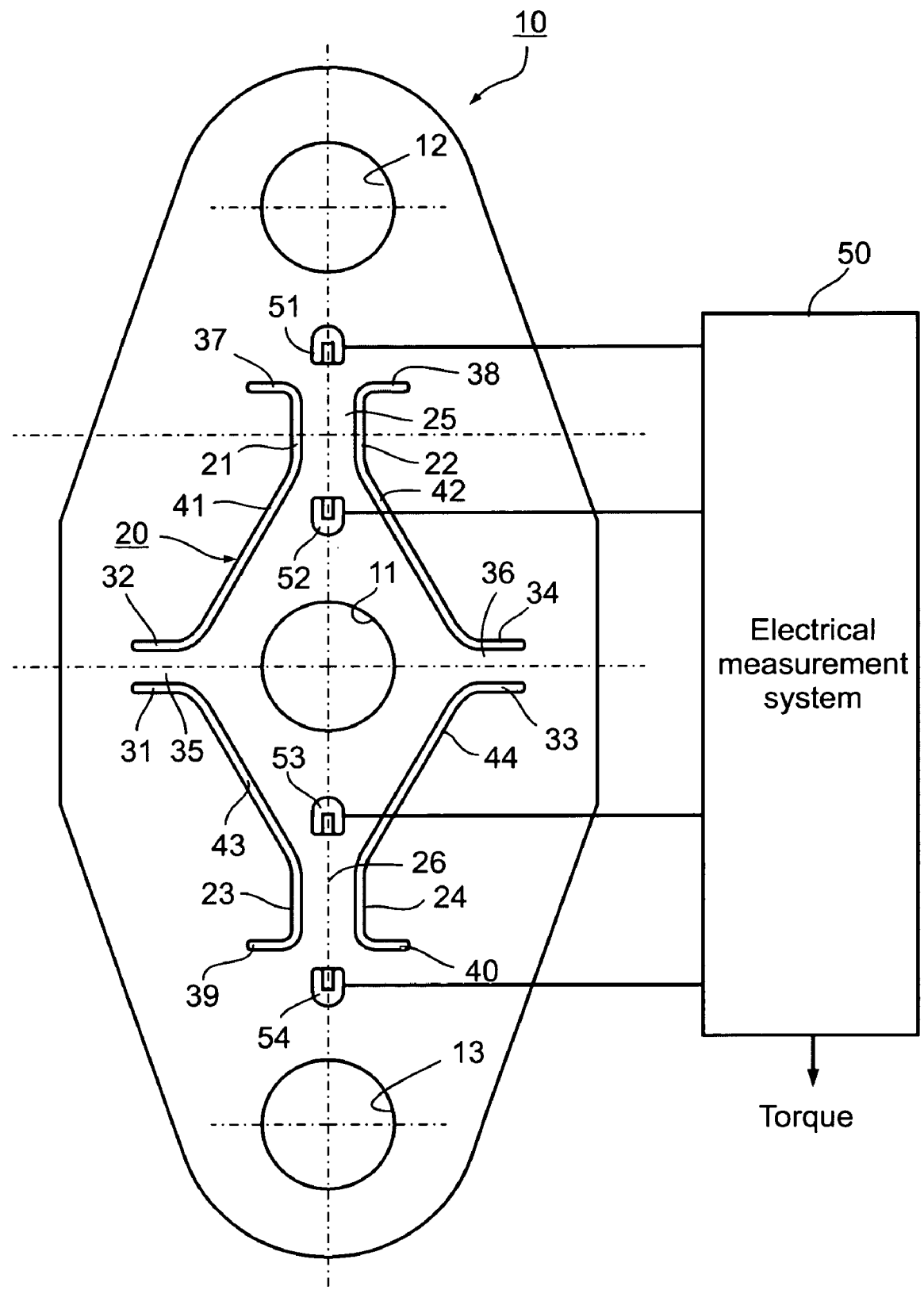
FIG. 4 is an enlarged view of the torque sensor plate of FIGS. 1 and 3 and its connection to the electrical system for measuring the torque sensed by the torque sensor plate.

Each torque sensor plate 10 is of a flat, elongated configuration best seen in FIG. 4. It is widest at its central section and decreases in width towards its two end sections. Its central section is formed with a central opening 11 for receiving its fastening bolt 6 which, as described above, also secures the flywheel disc 2 to the clutch disc 4. Its two end sections are formed with openings 12, 13. Each of the latter openings receives another fastening bolt 14, 15, which bolts pass through aligned openings in the flywheel disc 2 alone. Bolts 14, 15 receive locking rings 16, 17, and nuts 18, 19 (FIGS. 1 and 3) to secure the opposite ends of the torques sensor plate 10 to the flywheel disc 2.

It will thus be seen, as shown particularly in FIG. 3, each fastener bolt 6, passing through the center of its respective torque sensor plate 10, serves to fix the torque sensor plate to the clutch disc 4 at a first fixation point eccentric with respect to the common axis of rotation of the two discs defined by shafts 3 and 5. It will also be seen that the other two fastener bolts 14, 15, passing through the end openings 12, 13 of the respective torque sensor plate 10, serve to fix the torque sensor plate to the flywheel disc 2 at second and third fixation points, respectively, equally spaced on opposite sides of the first fixation point of fastener bolt 6. Thus, the torque transmitted by flywheel disc 2 to the clutch disc 4 will subject each torque sensor plate 10 to strains or deformations corresponding to the torque transmitted, as will be described more particularly below.

Figure 2:
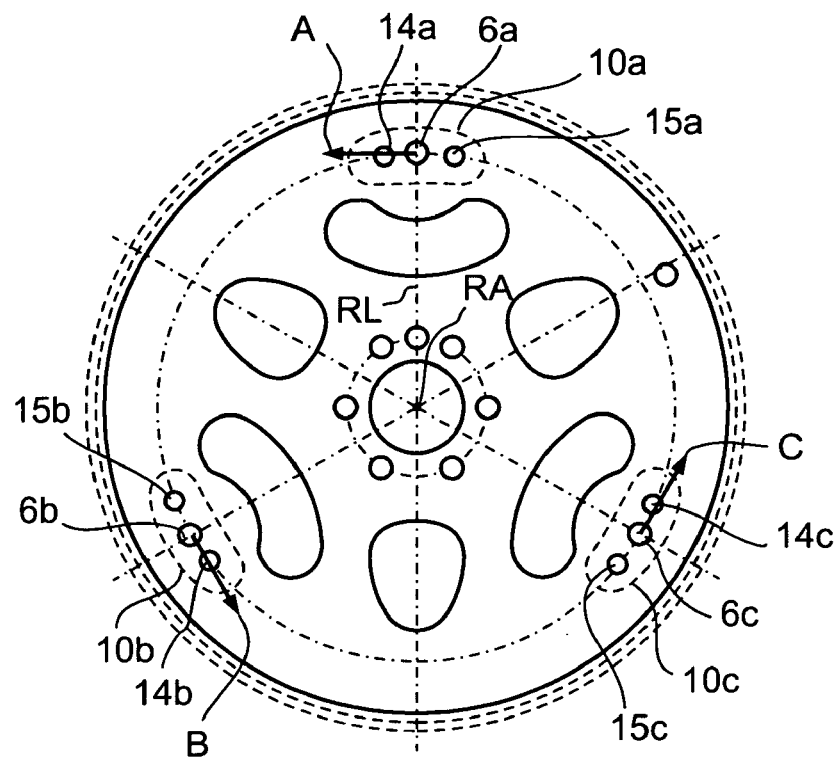
FIG. 2 is an end view diagrammatically illustrating the torque measuring device of FIG. 1 with the three torque sensor plates thereof.

FIG. 2 illustrates the assembly of FIG. 1 when all three torque sensor plates are applied for coupling the flywheel disc 2 to the clutch disc 4 in the manner described above with respect to the single torque sensor plate 10 of FIG. 1. In FIG. 2, the three torque sensor plates, each corresponding to plate 10 in FIG. 1, are identified as 10a, 10b and 10c, respectively; and their three fastening bolts, corresponding to bolts 6, 14 and 15 in FIG. 1, are identified as 6a-6c, 14a-14c and 15a-15c, respectively.

As shown particularly in FIG. 2, each of the three torque sensor plates 10a, 10b, 10c is mounted such that the first fixation point effected by the three bolts 6a, 6b, 6c, is eccentric with respect to the common rotary axis RA of the two shafts 3, 5. In addition each of the second and third fixation points, effected by the bolts 14a-14c and 15a-15c, respectively, is on a tangential line passing through the respective first fixation point of the respective bolts 6a-6c, i.e., on a line which is substantially perpendicular to a radial line RL from the respective first fixation point to the rotary axis RA of the two shafts. Thus, during the rotation of the shaft of the flywheel disc 2, a force will be applied by each of the three bolts 6a-6c to the three torque sensor plates 10a-10c in the tangential direction, as shown by arrows A-C, respectively, in FIG. 2. Such a tangential force applied by each of the three bolts 6a-6c will produce a contraction of a section of the respective torque sensor plate 10a-10c between the first fixation point (bolts 6a-6c) and the second fixation point (bolts 14a-14c), and an expansion of the section of the torque sensor plate on the opposite side, i.e., between the first fixation point (bolts 6a-6c) and the third fixation point (bolts 15a-15c).

The contracted and expanded sections of each torque sensor plate 10 are more particularly seen in FIG. 4. As shown, each torque sensor plate 10 is formed with a slot formation, generally designated 20, to increase the contraction and expansion of the sections of the torque sensor plate between the above-described three fixation points. Slot formation 20 includes a first pair of parallel slots 21, 22 between the central opening 11 and one end opening 12, and a second pair of parallel slots 23, 24 between the center opening 11 and the other end opening 13. Slots 21, 22 thus define a first deformable section 25 between openings 11 and 12; and slots 23, 24 define a second deformable section 26 between openings 11 and 13. It will be seen that the two sections 25, 26 are deformed in opposite senses during the rotation of the two discs 2, 4, according to the force applied to their respective fastener bolts 6; that is, when one of these sections is contracted, the other is elongated an equal amount.

Slot formation 20 formed in each torque sensor plate 10 includes two further pairs of parallel slots 31, 32 and 33, 34, respectively, located 90° with respect to slot pairs 21, 22 and 23, 24. A deformable section 35 is thus defined by slot pair 31, 32, and another deformable section 36 is defined by slot pair 33, 34. However, whereas sections 25 and 26 of the torque sensor plate are deformable by contraction or elongation, sections 35 and 36 are deformable by bending. The bending in sensor sections 35 and 36 thus increases the contraction or elongation in sensor sections 25, 26.

The contraction or elongation in sensor sections 25, 26 is further increased by the additional slots shown in FIG. 4, namely the outwardly extending end slots 37-40 formed at the outer ends of the parallel slots 21-24, respectively, and the connecting slots 41-44 interconnecting the two pairs of slots 21-24 with the two pairs of slots 31-34.

It will thus be seen that the contraction or elongation of sections 25 and 26 of each torque sensor plate 10 will correspond to the force on the respective center fastener bolt produced by the torque transmitted from the flywheel disc 2 to the clutch disc 4 via the respective torque sensor plate 10. The contraction or elongation of sensor sections 25, 26 may be measured by conventional strain gauges. Particularly good results are obtainable, however, when such deformations are measured by the electrical measuring system described in the above-cited U.S. Pat. No. 6,621,278, which permits extremely high accuracy to be achieved even with relative small deformations.

Figure 5:
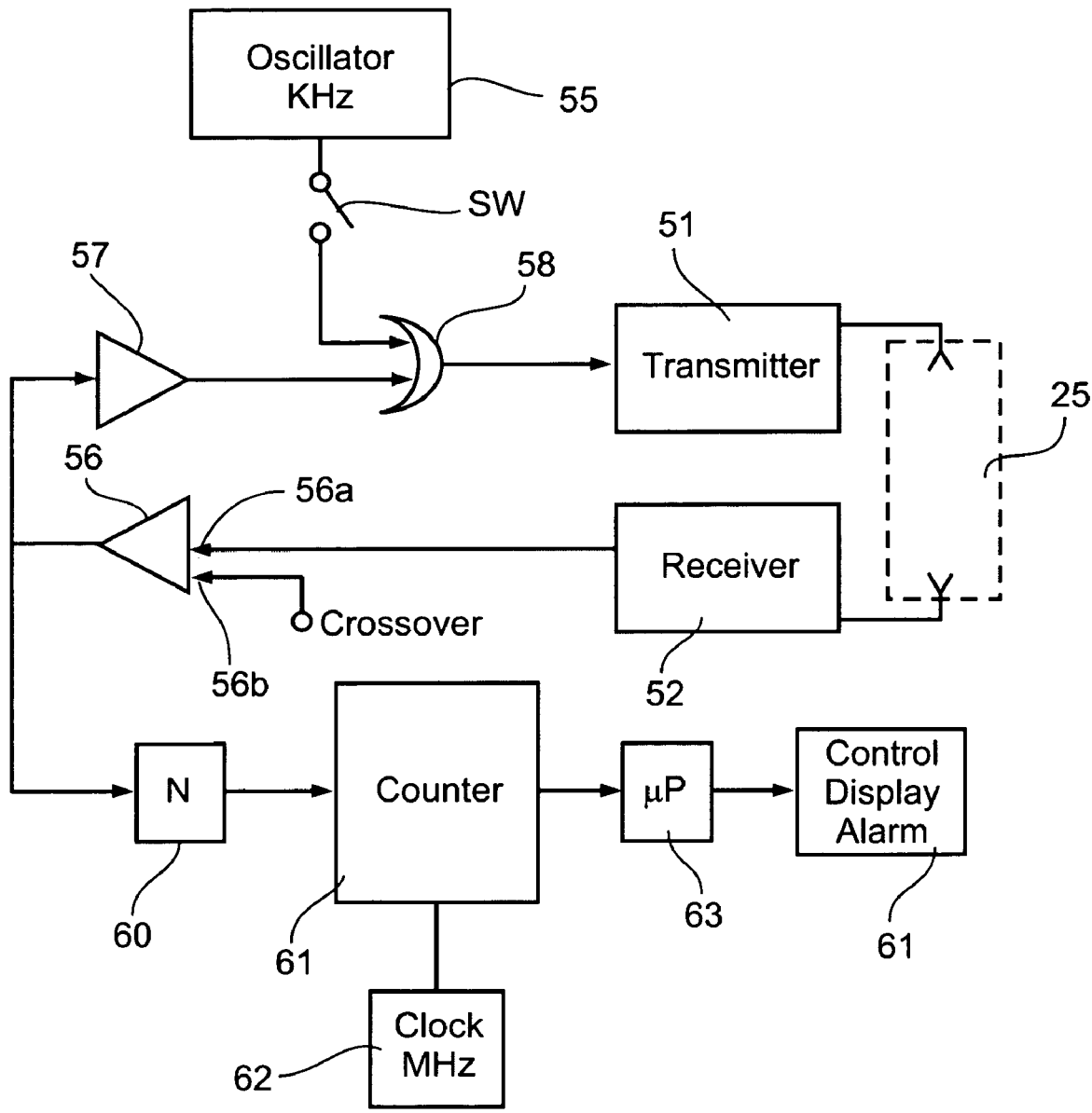
FIG. 5 is a block diagram illustrating the electrical measuring system of FIG. 4.

Such an electrical measuring system is schematically indicated by box 50 in FIG. 4, and is more particularly shown in FIG. 5. Broadly speaking, the deformation in each of the sections 25, 26 of the torque sensor plate 10 is measured by: transmitting a cyclically-repeating energy wave from one side of the respective section towards the other side; receiving the cyclically-repeating energy wave at the other side of the respective section; continuously changing the frequency of transmission of the cyclically-repeating energy wave such that the number of waves received is a whole integer; measuring the change in frequency; and utilizing the measured changes in frequency to produce a measurement of the deformations of the respective sensor sections 25, 26.

Such a measurement would thus be of the force on the fastener bolt 6 of the respective torque sensor plate produced by the engine torque. Thus, the total engine torque, i.e., the total torque transmitted between the flywheel disc 2 and the clutch disc 4, would be the summation of the torques transmitted by the three torque sensor plates 10a, 10b and 10c coupling the two discs together via the three fastener bolts 6a-6c.

As shown in FIG. 4, each torque sensor plate 10 is provided with a first transmitter 51 at one side of its deformable section 25; a first receiver 52 at the opposite side of its deformable section 25; a second transmitter 53 at one side of its deformable section 26; and a second receive 54 at the opposite side of its deformable section 26. In the described preferred embodiment, the two transmitters and receivers are both of the acoustical type for transmitting and receiving cyclically-repeating acoustical waves.

The electrical measuring system shown within block 50 in FIG. 4, for measuring the elongation and contraction of the sensor sections 25 and 26 of the torque sensor plates 10a-10c, is more particularly illustrated in FIG. 5. For the sake of simplicity, FIG. 5 illustrates only the circuitry of the electrical system operative with transmitter 51 and receiver 52 for measuring the elongation or contraction of sensor section 25 of one of the torque sensor plates 10a-10c. It will be appreciated, however, that the system would also include similar circuitry operative with transmitter 53 and receiver 54 for sensing the elongation or contraction of sensor section 26 of the respective torque sensor plate, as well as similar circuitry for sensing the contraction and expansion occurring in the other two torque sensor plates during the transmission of the torque from flywheel disc 2 to clutch disc 4.

Thus, as shown in FIG. 5, the electrical measuring system 50 includes an oscillator 55 for initially driving transmitter 51 via a switch SW until an acoustical wave from the transmitter is received by the receiver 52. Once such a wave is received by receiver 52, switch SW is opened, so that the signals received by receiver 52 are thereafter used for controlling the frequency of transmission of transmitter 51.

As shown in FIG. 5, the signals received by receiver 52 are fed to a comparator 56 via its input 56a. Comparator 56 includes a second input 56b connected to a predetermined bias so as to detect a predetermined fiducial or reference point in the received signal. In the example illustrated in FIG. 5, this predetermine fiducial point is the "0" cross-over point of the received signal, and therefore input 56b is at a zero-bias. Other reference points could be used as the fiducial point, such as the leading edge, the maximum peak, or the minimum peak of the received signals.

The output of comparator 56 is fed to an amplifier 57 which is triggered to produce an output wave or signal for each fiducial point ("0" cross-over point) in the signals received by the receiver 53. The signals from amplifier 57 are fed via an OR-gate 58 to the transmitter 52. OR-gate 58 also receives the output from oscillator 55 when switch SW is closed.

Switch SW is opened when transmitter 52 receives a continuous stream of signals from amplifier 57 via OR-gate 58. When switch SW is opened, transmitter 52 will thus transmit at a frequency determined by the fiducial point in the signals received by the receiver 53 and detected by comparator 56 to control amplifier 57. Accordingly, the frequency of transmission by transmitter 52 will be such that the number of waves of the cyclically-repeating energy wave transmitted from transmitter 51 and received by receiver 52 will be a whole integer.

It will thus be seen that while the frequency of the transmitter 52 will change with a change in the distance between it and the receiver 53, as caused by the elongation or contraction of sensor section 25, the number of wavelengths in the signal transmitted from transmitter 52 will remain a whole integer. This is because, as explained above, the transmitter 52 transmissions are controlled by the fiducial points ("0" cross-over point) of the signals received by the receiver 53. This change in frequency by the transmitter 52, while maintaining the number of waves between the transmitter and receiver as a whole integer, enables a precise determination to be made of the distance between the transmitter and receiver. Thus, as known:

$$F=C/\lambda$$

where F and C are the frequency and velocity, respectively, of the cyclically-repeating energy wave in the respective medium; and $\lambda$ is the wavelength.

The "0" cross-over points detected in comparator 56, which are used for controlling the frequency of the transmitter 52, are also fed to a counter 60 to be counted "N" times, and the output is fed to another counter 61 controlled by a clock 62. Counter 61 produces an output to a microprocessor 63 which performs the computations of the engine torque according to the elongations and contractions measured, and a display 64 which displays the output of the microprocessor.

The output of microprocessor 63 thus represents the measured torque. It may be applied as a control signal, as shown at 65, to control the feed of the fuel to the engine or the ignition of the fuel. It may also be used to provide a continuous indication of the engine torque output, the engine condition (e.g., the need for repair or overhaul), or any other information or control relevant to the engine torque output.

Further particulars as to the measuring system illustrated in FIG. 5 are available in the above-cited U.S. Pat. No. 6,621,278, the contents of which are incorporated herein by reference. It has been found that using such a measuring system for measuring the above-described deformations in the torque sensor plate produces a torque measurement of extremely high precision. While such a measuring system is therefore preferred, other electrical measuring systems for measuring the deformations in the torque sensor plates may be used, such as conventional strain gauges.

It has also been found that using a torque sensor which undergoes an elongation in one section, and a complementary contraction in another section, produces not only a highly-precise measurement of torque, but also a measurement which is relatively insensitive to temperature or angular velocity variations. Thus, the influence of temperature is the same in both the expansion signal and the contraction signal, and therefore subtracting one signal from the other eliminates the temperature influence. In addition, since in the described preferred embodiment, the force which is sensed is a tangential force with respect to the rotary axis, rather than a radial force, the output signals produced are relatively unaffected by the rotational velocity, which produces radial (centrifugal) forces.

Further advantages of the described torque sensor are that it provides a simple and compact construction which is conveniently incorporatable in existing vehicle transmission systems and which is capable of withstanding harsh environments.

The torque sensor plates are preferably metal in the vehicle embodiment described, producing relatively small elongations and contractions, but in other embodiments, they may be of plastic or elastomeric material having good ultrasound conductivity and producing larger elongations and contractions. The elongations and contractions of each of the sensor plates 10a-10c may be independently measured as described above to produce a precise measurement of the total torque; alternatively, the elongations and contractions of only one sensor plate may be actually measured and the torque represented by such measurements may be multiplied by the number of such plates (three) to obtain a close approximation of the total torque. The outputs of the sensors may be fed to the electrical measuring system via slip rings, wireless transmitters, etc.

Figure 6:
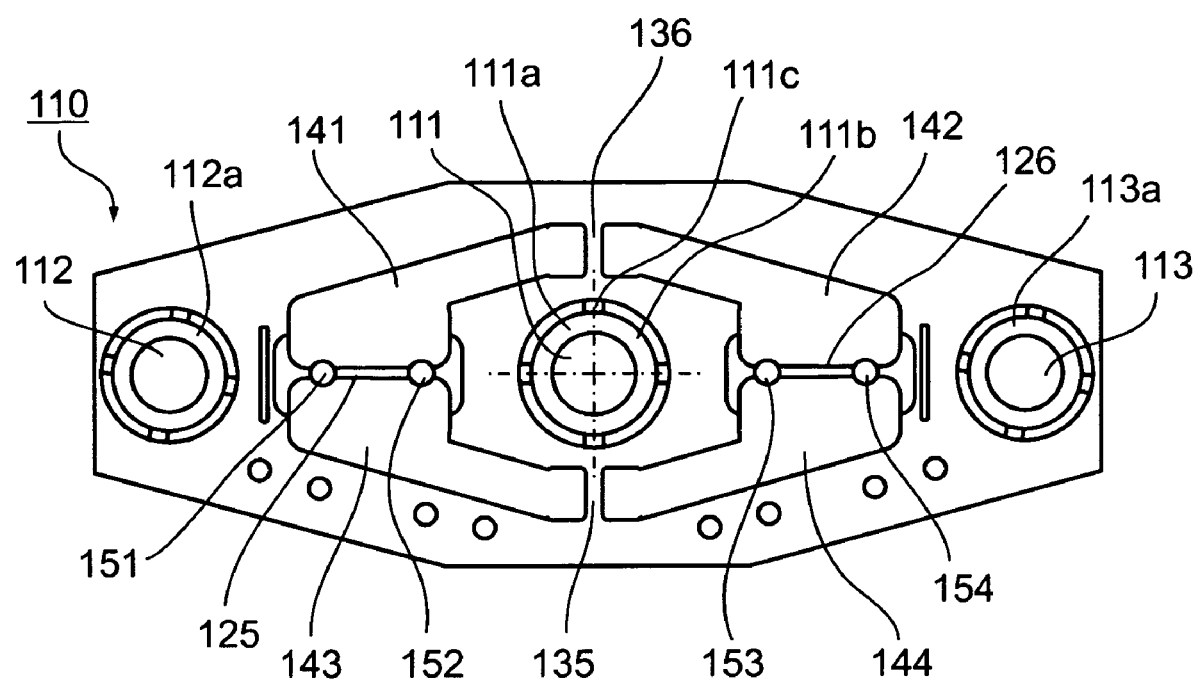
FIG. 6 illustrates a modification in the torque sensor plate shown in FIG. 4.

FIG. 6 illustrates a modification in the torque sensor plate, therein generally designated 110. Torque sensor plate 110 is also made of metal and is formed with the three fastening openings, shown at 111, 112 and 113, corresponding to openings 11, 12 and 13 in FIG. 4. In this case, however, each opening is defined by a socket 111a, 112a, 113a floatingly mounted to the remainder of the sensor plate by a circular slot (e.g., 111b) interrupted by a series of webs 111c. All the slots 111b, and the corresponding slots formed with respect to openings 112 and 113, are filled with an insulating material, preferably an epoxy resin, tending to absorb the acoustical wave reflections produced in the sensor plate.

In the sensor plate 110 illustrated in FIG. 6, the acoustical wave transmission channels, therein designated 125 and 126 (corresponding to channels 25 and 26, respectively, in FIG. 4), are also defined by a plurality of slots 141-144, corresponding to slots 41-44, respectively, in FIG. 4. In this case, however, the slots are much wider such as to produce narrow transmission channels 125, 126, and narrow webs 135, 136, mounting the centerpart of the torque sensor plate to the outer peripheral portion.

As described above with respect to FIG. 4, each of the transmission channels 125, 126, includes a transmitter and receiver at its opposite ends, as shown by elements 151-154 corresponding to the transmitters and receivers 51-54 in FIG. 4.

In all other respects, torque sensor plate 110 illustrated in FIG. 6 is of substantially the same construction, and operates substantially in the same manner, as torque sensor plate 10 described above with respect to FIGS. 1-5.

Although the invention has been described in conjunction with specific embodiments thereof, it is evident that many alternatives, modifications and variations will be apparent to those skilled in the art. For example, the invention may be implemented in methods and apparatus for sensing or measuring other forces, e.g., weight or the like, and may sense the force applied to other forms of connecting members, such as bolts or the like.

What is claimed is:

1. A method of measuring a force applied by a first member to a second member via a connecting body secured at a first location thereon to said first member, and at a second location thereon, spaced from said first location, to said second member, comprising:

transmitting a cyclically-repeating acoustical wave through a transmission channel in said connecting body from a first location thereon to said second location thereon;

measuring the transit time of said acoustical wave through said transmission channel from said first location to said second location;

and utilizing said measured transit time to produce a measurement of said force;

wherein said connecting body is a fastening plate which fastens said first member to said second member, and said first and second members are a first rotary member and a second rotary member fastened for rotation together about a common axis of rotation by said fastening plate, such that the force measured is the torque applied by said first rotary member to said second rotary member.

2. The method according to claim 1, wherein said fastening plate is fixed at a first fixation point to said first rotary member, and at a second fixation point to said second rotary member; said transmission channel of the fastening plate being between said first and second fixation points such that said measured transit time of the cyclically-repeating energy wave represents a measurement of the strain of the fastening plate in said transmission channel between said first and second fixation points.

3. The method according to claim 2, wherein said second fixation point is spaced from said first fixation point along a tangential line substantially perpendicular to a radial line from said first fixation point to said axis of rotation, such that the section of the fastening plate between said first and second fixation points is deformed by being expanded or contracted, depending on the direction of rotation of said rotary members.

4. The method according to claim 3, wherein said fastening plate is also fixed to said second rotary member at a third fixation point, said third fixation point being on said tangential line but on the opposite side of said first fixation point as said second fixation point, and being equally spaced from said first fixation point as said second fixation point, such as to produce, between said first and third fixation points, another transmission channel in the fastening plate which is deformed in the opposite sense as said first-mentioned transmission channel during the rotation of said drive shaft; said latter deformation also being measured and utilized to produce a measurement of said torque.

5. The method according to claim 4, wherein said fastening plate is formed with a slot formation defining said first and second transmission channels in the fastening plate undergoing deformation during the rotation of the drive shaft.

6. The method according to claim 1, wherein the two rotary members are coupled together by a plurality of said fastening plates equally spaced eccentrically around the axis of rotation of the rotary members.

7. The method according to claim 1, wherein said first rotary member is a drive shaft of a vehicle, and said second rotary member is a driven shaft of the vehicle.

8. A method of measuring a force applied by a first member to a second member via a connecting body secured at a first location thereon to said first member, and at a second location thereon, spaced from said first location, to said second member, comprising:

transmitting a cyclically-repeating acoustical wave through a transmission channel in said connecting body from said first location thereon to said second location thereon;
  measuring the transit time of said acoustical wave through said transmission channel from said first location to said second location;
  and utilizing said measured transit time to produce a measurement of said force;
  wherein the transit time of said cyclically-repeating acoustical wave from said first location to said second location is measured by:
  detecting a predetermined fiducial point in the cyclically-repeating acoustical wave received at said second location;
  continuously changing the frequency of transmission of the cyclically-repeating acoustical wave in accordance with the detected fiducial point of each received wave such that the number of waves received is a whole integer;
  and utilizing the measured change in frequency to produce a measurement of said transit time of the cyclically-repeating acoustical wave from said first location to said second location.

9. Apparatus for measuring a force applied by a first member to a second member via a connecting body secured at a first location thereon to said first member, and at a second location thereon, spaced from said first location, to said second member, comprising:

a transmitter at a first location on said connecting body for transmitting a cyclically-repeating acoustical wave through a transmission channel in said connecting body to a second location thereon;
  a receiver at said second location on said connecting body for receiving said cyclically-repeating acoustical wave;
  and an electrical system for measuring the transit time of the cyclically-repeating acoustical wave through said transmission channel from said first location to said second location and for utilizing said measured transit time to produce a measurement of said force;
  wherein said connecting body is a fastening plate which fastens said first member to said second member, and said first and second members are a first rotary member and a second rotary member fastened for rotation together about a common axis of rotation by said fastening plate, such that the force measured is the torque applied by said first rotary member to said second rotary member.

10. The apparatus according to claim 9, wherein said fastening plate is fixed at a first fixation point to said first rotary member, and at a second fixation point to said second rotary member; said transmission channel of the fastening plate being between said first and second fixation points such that said measured transit time of the cyclically-repeating energy wave represents a measurement of the strain of the fastening plate in said transmission channel between said first and second fixation points.

11. The apparatus according to claim 10, wherein said second fixation point is spaced from said first fixation point along a tangential line substantially perpendicular to a radial line from said first fixation point to said axis of rotation, such that the deformed section of the fastening plate between said first and second fixation points is expanded or contracted, depending on the direction of rotation of said rotary members.

12. The apparatus according to claim 11, wherein said fastening plate is also fixed to said second rotary member at a third fixation point, said third fixation point being on said tangential line but on the opposite side of said first fixation point as said second fixation point, and being equally spaced from said first fixation point as said second fixation point, such as to produce, between said first and third fixation points, another transmission channel in the fastening plate which is deformed in the opposite sense as said first-mentioned transmission channel during the rotation of said drive shaft; said latter deformation also being measured and utilized to produce a measurement of said torque.

13. The apparatus according to claim 12, wherein said fastening plate is formed with a slot formation defining said first and second transmission channels in the fastening plate undergoing deformation during the rotation of the drive shaft.

* * * * *